US008284234B2

(12) United States Patent  
Bjelkhagen et al.

(10) Patent No.: US 8,284,234 B2
(45) Date of Patent: Oct. 9, 2012

(54) ENDOSCOPIC IMAGING USING REFLECTION HOLOGRAPHIC OPTICAL ELEMENT FOR AUTOSTEREOSCOPIC 3-D VIEWING

(75) Inventors: Hans Ingmar Bjelkhagen, Dyserth (GB); James Clement Fischbach, Birmingham, MI (US)

(73) Assignee: Absolute Imaging LLC, Livonia, MI (US)

( * ) Notice: Subject to any disclaimer, the term of this patent is extended or adjusted under 35 U.S.C. 154(b) by 616 days.

(21) Appl. No.: 12/428,118

(22) Filed: Apr. 22, 2009

(65) Prior Publication Data

US 2010/0238530 A1   Sep. 23, 2010

Related U.S. Application Data

(63) Continuation-in-part of application No. 12/408,447, filed on Mar. 20, 2009.

(51) Int. Cl.
*H04N 5/89* (2006.01)
*H04N 7/00* (2011.01)

(52) U.S. Cl. ............... 348/40; 348/42; 348/45; 348/46; 345/7

(58) Field of Classification Search .................. 348/40, 348/42, 45, 46; 345/7
See application file for complete search history.

(56) References Cited

U.S. PATENT DOCUMENTS

| | | | |
|---|---|---|---|
| 3,825,316 A | 7/1974 | Amodei | |
| 4,120,559 A | 10/1978 | Abramson et al. | |
| 4,182,316 A | 1/1980 | Nilsson et al. | |
| 4,764,012 A | 8/1988 | Ryden et al. | |
| 4,799,739 A | 1/1989 | Newswanger | |
| 5,014,709 A | 5/1991 | Bjelkhagen et al. | |
| 5,039,182 A | 8/1991 | Dube et al. | |
| 5,191,449 A | 3/1993 | Newswanger | |
| 5,291,317 A | 3/1994 | Newswanger | |
| 5,331,468 A | 7/1994 | Noethen | |
| 5,886,675 A * | 3/1999 | Aye et al. ..................... 345/7 |
| 5,920,536 A | 7/1999 | Campbell et al. | |
| 5,972,546 A | 10/1999 | Bjelkhagen | |
| 5,993,006 A | 11/1999 | Takeuchi et al. | |

(Continued)

FOREIGN PATENT DOCUMENTS

DE   20 2005 004 082 U1   9/2005

(Continued)

OTHER PUBLICATIONS

Zahir Y. Alpaslan and Alexander A. Sawchuk, "Three-Dimensional Interaction with Autostereoscopic Displays", Stereoscopic Displays and Virtual Reality Systems XI, edited by Andrew J. Woods, John W. Merritt, Stephen A. Benton, Mark T. Bolas, Proc. of SPIE—IS&T Electronic Imaging, SPIE vol. 5291, 2004, pp. 227-236.

(Continued)

*Primary Examiner* — Liangche A Wang
(74) *Attorney, Agent, or Firm* — Brooks Kushman P.C.

(57) ABSTRACT

Systems and methods for generating a three-dimensionally perceived image from a stereo endoscope by at least one viewer include an autostereoscopic display having a left projector and a right projector that project corresponding left and right images received from corresponding left and right cameras of the stereo endoscope onto a reflective holographic optical element that redirects light from the left projector to a left viewing zone for a left eye and redirects light from the right projector to a right viewing zone for a right eye of a viewer to create a three-dimensionally perceived image without glasses or optical headgear.

16 Claims, 4 Drawing Sheets

U.S. PATENT DOCUMENTS

| | | | |
|---|---|---|---|
| 5,993,600 A | 11/1999 | Ueda et al. | |
| 6,011,580 A * | 1/2000 | Hattori et al. | 348/57 |
| 6,104,426 A | 8/2000 | Street | |
| 6,115,123 A | 9/2000 | Stappaerts et al. | |
| 6,157,474 A | 12/2000 | Orr et al. | |
| 6,163,336 A * | 12/2000 | Richards | 348/42 |
| 6,175,431 B1 | 1/2001 | Waldern et al. | |
| 6,211,977 B1 | 4/2001 | Son et al. | |
| 6,224,214 B1 | 5/2001 | Martin et al. | |
| 6,233,071 B1 | 5/2001 | Orr et al. | |
| 6,292,279 B1 | 9/2001 | Matsuyama | |
| 6,330,088 B1 | 12/2001 | Klug et al. | |
| 6,396,042 B1 | 5/2002 | Boardman et al. | |
| 6,414,727 B1 | 7/2002 | Benton | |
| 6,476,092 B1 | 11/2002 | Kunita | |
| 6,482,551 B1 | 11/2002 | Dhar et al. | |
| 6,483,534 B1 | 11/2002 | d'Ursel | |
| 6,590,680 B2 | 7/2003 | Orr et al. | |
| 6,618,190 B2 | 9/2003 | Kitamura et al. | |
| 6,650,447 B2 | 11/2003 | Curtis et al. | |
| 6,665,100 B1 | 12/2003 | Klug et al. | |
| 6,695,213 B2 | 2/2004 | Curtis | |
| 6,697,180 B1 | 2/2004 | Wilson et al. | |
| 6,700,686 B2 | 3/2004 | King et al. | |
| 6,721,075 B2 | 4/2004 | Orr et al. | |
| 6,721,076 B2 | 4/2004 | King et al. | |
| 6,735,002 B2 | 5/2004 | Ayres | |
| 6,743,552 B2 | 6/2004 | Setthachayanon et al. | |
| 6,765,061 B2 | 7/2004 | Dhar et al. | |
| 6,780,546 B2 | 8/2004 | Trentler et al. | |
| 6,788,443 B2 | 9/2004 | Curtis et al. | |
| 6,798,547 B2 | 9/2004 | Wilson et al. | |
| 6,806,982 B2 | 10/2004 | Newswanger et al. | |
| 6,811,930 B2 | 11/2004 | Kim | |
| 6,825,960 B2 | 11/2004 | Curtis et al. | |
| 6,825,992 B2 | 11/2004 | Shuman | |
| 6,831,762 B2 | 12/2004 | Schuck et al. | |
| 6,847,498 B2 | 1/2005 | Curtis et al. | |
| 6,856,461 B2 | 2/2005 | Curtis | |
| 6,859,293 B2 | 2/2005 | Klug et al. | |
| 6,885,510 B2 | 4/2005 | Hoogland et al. | |
| 6,909,529 B2 | 6/2005 | Curtis | |
| 6,912,074 B1 | 6/2005 | Son et al. | |
| 6,914,704 B2 | 7/2005 | Shuman | |
| 6,924,942 B2 | 8/2005 | Curtis et al. | |
| 6,930,811 B2 | 8/2005 | Brotherton-Ratcliffe et al. | |
| 6,932,476 B2 | 8/2005 | Sudo et al. | |
| 6,934,074 B2 | 8/2005 | Kitamura et al. | |
| 6,939,648 B2 | 9/2005 | Dhar et al. | |
| 6,940,473 B2 | 9/2005 | Suyama et al. | |
| 6,950,078 B2 | 9/2005 | Suyama et al. | |
| 6,956,681 B2 | 10/2005 | Anderson | |
| 6,982,817 B1 | 1/2006 | Halldorsson | |
| 6,985,765 B2 | 1/2006 | Morita et al. | |
| 7,001,541 B2 | 2/2006 | Dhar | |
| 7,002,532 B2 | 2/2006 | Suyama et al. | |
| 7,003,004 B2 | 2/2006 | Rodin et al. | |
| 7,009,742 B2 | 3/2006 | Brotherton-Ratcliffe et al. | |
| 7,020,885 B2 | 3/2006 | Hertrich | |
| 7,027,197 B2 | 4/2006 | Newswanger et al. | |
| 7,042,605 B2 | 5/2006 | Brotherton-Ratcliffe et al. | |
| 7,046,271 B2 | 5/2006 | Doerfel et al. | |
| 7,053,925 B2 | 5/2006 | Payne et al. | |
| 7,057,779 B2 | 6/2006 | Lee | |
| 7,064,895 B2 | 6/2006 | Morishima et al. | |
| 7,079,296 B2 | 7/2006 | Anderson | |
| 7,092,133 B2 | 8/2006 | Anderson et al. | |
| 7,099,058 B2 | 8/2006 | Takemori et al. | |
| 7,108,657 B2 | 9/2006 | Irion et al. | |
| 7,112,359 B2 | 9/2006 | Dhar et al. | |
| 7,116,626 B1 | 10/2006 | Woods et al. | |
| 7,123,287 B2 | 10/2006 | Surman | |
| 7,148,859 B2 | 12/2006 | Suyama et al. | |
| 7,149,015 B2 | 12/2006 | Hoogland et al. | |
| 7,150,531 B2 | 12/2006 | Toeppen | |
| 7,161,722 B2 | 1/2007 | Brotherton-Ratcliffe et al. | |
| 7,167,286 B2 | 1/2007 | Anderson et al. | |
| 7,170,677 B1 | 1/2007 | Bendall et al. | |
| 7,173,744 B1 | 2/2007 | Whiteside et al. | |
| 7,180,644 B2 | 2/2007 | Hoogland et al. | |
| 7,184,212 B2 | 2/2007 | Takahashi et al. | |
| 7,184,383 B2 | 2/2007 | Ayres et al. | |
| 7,190,496 B2 | 3/2007 | Klug et al. | |
| 7,199,814 B2 | 4/2007 | Rodin et al. | |
| 7,209,269 B1 | 4/2007 | Sathyan | |
| 7,209,270 B2 | 4/2007 | Curtis | |
| 7,227,674 B2 | 6/2007 | Klug et al. | |
| 7,229,741 B2 | 6/2007 | Setthachayanon et al. | |
| 7,232,637 B2 | 6/2007 | Cole et al. | |
| 7,262,891 B2 | 8/2007 | Brotherton-Ratcliffe et al. | |
| 7,295,356 B2 | 11/2007 | King | |
| 7,324,248 B2 | 1/2008 | Brotherton-Ratcliffe et al. | |
| 7,333,252 B2 | 2/2008 | Brotherton-Ratcliffe et al. | |
| 7,336,409 B2 | 2/2008 | Sissom | |
| 7,391,593 B2 | 6/2008 | Hertrich | |
| 7,397,571 B2 | 7/2008 | Krneta et al. | |
| 7,400,447 B2 | 7/2008 | Sudo et al. | |
| 7,405,853 B2 | 7/2008 | Sissom et al. | |
| 7,405,877 B1 | 7/2008 | Schechterman | |
| 7,423,792 B2 | 9/2008 | Brotherton-Ratcliffe et al. | |
| 7,425,069 B2 | 9/2008 | Schwerdtner et al. | |
| 7,435,941 B2 | 10/2008 | Ayres | |
| 7,450,188 B2 | 11/2008 | Schwerdtner | |
| 7,453,618 B2 | 11/2008 | Sissom et al. | |
| 7,466,411 B2 | 12/2008 | Riley et al. | |
| 7,475,413 B2 | 1/2009 | Hertrich | |
| 7,480,085 B2 | 1/2009 | Riley et al. | |
| 7,483,189 B2 | 1/2009 | Matsumura et al. | |
| 7,492,691 B2 | 2/2009 | Earhart | |
| 7,923,801 B2 * | 4/2011 | Tian et al. | 257/440 |
| 2002/0126331 A1 | 9/2002 | Orr et al. | |
| 2003/0058490 A1 | 3/2003 | Brotherton-Ratcliffe et al. | |
| 2003/0086136 A1 | 5/2003 | Orr et al. | |
| 2003/0123116 A1 | 7/2003 | Shuman | |
| 2003/0151809 A1 | 8/2003 | Takahashi et al. | |
| 2003/0156308 A1 | 8/2003 | Brotherton-Ratcliffe et al. | |
| 2003/0189740 A1 | 10/2003 | Hoogland et al. | |
| 2003/0206320 A1 | 11/2003 | Cole et al. | |
| 2004/0012833 A1 | 1/2004 | Newswanger et al. | |
| 2004/0027625 A1 | 2/2004 | Trentler et al. | |
| 2004/0047375 A1 | 3/2004 | Rodin et al. | |
| 2004/0050280 A1 | 3/2004 | Rodin et al. | |
| 2004/0114204 A1 | 6/2004 | Klug et al. | |
| 2004/0174578 A1 | 9/2004 | Hoogland et al. | |
| 2004/0240015 A1 | 12/2004 | Newswanger et al. | |
| 2004/0263787 A1 | 12/2004 | Liang et al. | |
| 2005/0018316 A1 | 1/2005 | Curtis et al. | |
| 2005/0028185 A1 | 2/2005 | Hertrich | |
| 2005/0028186 A1 | 2/2005 | Hertrich | |
| 2005/0046795 A1 | 3/2005 | Toeppen | |
| 2005/0052714 A1 | 3/2005 | Klug et al. | |
| 2005/0052717 A1 | 3/2005 | Brotherton-Ratcliffe et al. | |
| 2005/0089795 A1 | 4/2005 | Cole et al. | |
| 2005/0094230 A1 | 5/2005 | Klug et al. | |
| 2005/0157359 A1 | 7/2005 | Bjelkhagen et al. | |
| 2005/0200924 A1 | 9/2005 | Brotherton-Ratcliffe et al. | |
| 2005/0200925 A1 | 9/2005 | Brotherton-Ratcliffe et al. | |
| 2005/0200927 A1 | 9/2005 | Brotherton-Ratcliffe et al. | |
| 2005/0231777 A1 | 10/2005 | Curtis | |
| 2005/0248817 A1 | 11/2005 | Weaver et al. | |
| 2005/0270855 A1 | 12/2005 | Earhart et al. | |
| 2005/0270856 A1 | 12/2005 | Earhart et al. | |
| 2005/0286387 A1 | 12/2005 | Ayres et al. | |
| 2005/0286388 A1 | 12/2005 | Ayres et al. | |
| 2006/0050342 A1 | 3/2006 | Anderson | |
| 2006/0098260 A1 | 5/2006 | Newswanger et al. | |
| 2006/0114532 A1 | 6/2006 | Brotherton-Ratcliffe et al. | |
| 2006/0126682 A1 | 6/2006 | Rodin et al. | |
| 2006/0166104 A1 | 7/2006 | Setthachayanon et al. | |
| 2006/0194120 A1 | 8/2006 | Cole et al. | |
| 2006/0238841 A1 | 10/2006 | Anderson et al. | |
| 2006/0274393 A1 | 12/2006 | Fotheringham et al. | |
| 2006/0274394 A1 | 12/2006 | Riley et al. | |
| 2006/0275670 A1 | 12/2006 | Riley et al. | |
| 2006/0279818 A1 | 12/2006 | Ayres et al. | |
| 2006/0279819 A1 | 12/2006 | Krneta et al. | |
| 2006/0279820 A1 | 12/2006 | Riley et al. | |

| Publication No. | Date | Inventor |
|---|---|---|
| 2006/0279821 A1 | 12/2006 | Riley et al. |
| 2006/0279822 A1 | 12/2006 | Kmeta et al. |
| 2006/0279823 A1 | 12/2006 | Riley et al. |
| 2006/0279824 A1 | 12/2006 | Riley et al. |
| 2006/0280096 A1 | 12/2006 | Riley et al. |
| 2006/0281021 A1 | 12/2006 | Riley et al. |
| 2006/0291022 A1 | 12/2006 | Redmond et al. |
| 2006/0291023 A1 | 12/2006 | Riley et al. |
| 2007/0030544 A1 | 2/2007 | Brotherton-Ratcliffe et al. |
| 2007/0070479 A1 | 3/2007 | Brotherton-Ratcliffe et al. |
| 2007/0091399 A1 | 4/2007 | Ihas et al. |
| 2007/0091768 A1 | 4/2007 | Hori et al. |
| 2007/0115523 A1 | 5/2007 | Matsumura et al. |
| 2007/0127100 A1 | 6/2007 | Wilson et al. |
| 2007/0160106 A1 | 7/2007 | Hunter et al. |
| 2007/0166625 A1 | 7/2007 | Cole et al. |
| 2007/0183008 A1 | 8/2007 | Kogure et al. |
| 2007/0188667 A1 | 8/2007 | Schwerdtner |
| 2007/0206252 A1 | 9/2007 | Sissom |
| 2007/0211321 A1 | 9/2007 | Hoskins et al. |
| 2007/0216981 A1 | 9/2007 | Matsumura et al. |
| 2007/0223554 A1 | 9/2007 | Hunter et al. |
| 2007/0242589 A1 | 10/2007 | Redmond et al. |
| 2007/0248890 A1 | 10/2007 | Cole et al. |
| 2007/0253076 A1 | 11/2007 | Takaura et al. |
| 2007/0283369 A1 | 12/2007 | Schoenfeld et al. |
| 2007/0286056 A1 | 12/2007 | Ernst et al. |
| 2007/0296920 A1 | 12/2007 | Mezouari et al. |
| 2008/0007809 A1 | 1/2008 | Moss |
| 2008/0015412 A1 | 1/2008 | Hori |
| 2008/0030819 A1 | 2/2008 | Klug et al. |
| 2008/0030826 A1 | 2/2008 | Sissom et al. |
| 2008/0049283 A1 | 2/2008 | Sissom et al. |
| 2008/0059144 A1 | 3/2008 | Earhart et al. |
| 2008/0080031 A1 | 4/2008 | Harris et al. |
| 2008/0100890 A1 | 5/2008 | Curtis et al. |
| 2008/0102378 A1 | 5/2008 | Cole et al. |
| 2008/0138717 A1 | 6/2008 | Bjelkhagen et al. |
| 2008/0151340 A1 | 6/2008 | Brotherton-Ratcliffe et al. |
| 2008/0152340 A1 | 6/2008 | Hung et al. |
| 2008/0192317 A1 | 8/2008 | Sissom et al. |
| 2008/0192318 A1 | 8/2008 | Sissom et al. |
| 2008/0195890 A1 | 8/2008 | Earhart et al. |
| 2008/0197263 A1 | 8/2008 | Sissom et al. |
| 2008/0203282 A1 | 8/2008 | Ayres et al. |
| 2008/0222492 A1 | 9/2008 | Earhart et al. |
| 2008/0229147 A1 | 9/2008 | Earhart et al. |
| 2008/0239428 A1 | 10/2008 | Bell et al. |
| 2008/0243142 A1* | 10/2008 | Gildenberg ............... 606/130 |
| 2008/0247042 A1 | 10/2008 | Scwerdtner |
| 2008/0252970 A1 | 10/2008 | Takahashi et al. |
| 2008/0259421 A1 | 10/2008 | Curtis et al. |
| 2008/0273242 A1 | 11/2008 | Woodgate et al. |
| 2008/0297590 A1 | 12/2008 | Barber et al. |
| 2009/0014522 A1 | 1/2009 | Harris et al. |
| 2009/0017687 A1 | 1/2009 | Harris et al. |
| 2009/0152664 A1* | 6/2009 | Klem et al. ............... 257/440 |
| 2010/0056905 A1* | 3/2010 | Anderson ............... 600/424 |
| 2010/0130853 A1* | 5/2010 | Chandonnet et al. ...... 600/424 |

FOREIGN PATENT DOCUMENTS

| | | |
|---|---|---|
| DE | 20 2005 004 083 U1 | 9/2005 |
| DE | 60014168 T2 | 9/2005 |
| DE | 60018603 T2 | 12/2005 |
| DE | 60306375 T2 | 8/2007 |
| DE | 60212854 T2 | 9/2007 |
| DE | 69737407 T2 | 11/2007 |
| DE | 112006000477 T5 | 1/2008 |
| EP | 0467601 A2 | 1/1992 |
| EP | 0467601 A2 | 2/1996 |
| EP | 0741343 A2 | 11/1996 |
| EP | 0655147 B1 | 11/1997 |
| EP | 0764281 B1 | 12/1998 |
| EP | 0945762 A1 | 9/1999 |
| EP | 0850428 B1 | 1/2002 |
| EP | 0789853 B1 | 2/2002 |
| EP | 0992163 B1 | 4/2002 |
| EP | 0721132 B1 | 9/2002 |
| EP | 0726482 B1 | 9/2002 |
| EP | 1078294 B1 | 10/2002 |
| EP | 0721131 B1 | 4/2003 |
| EP | 1385066 A1 | 1/2004 |
| EP | 1394634 A2 | 3/2004 |
| EP | 1394635 A2 | 3/2004 |
| EP | 1422698 A2 | 5/2004 |
| EP | 0833182 B1 | 6/2004 |
| EP | 1244944 B1 | 9/2004 |
| EP | 1457974 A1 | 9/2004 |
| EP | 1236073 B1 | 3/2005 |
| EP | 1510862 A2 | 3/2005 |
| EP | 1414878 B1 | 6/2006 |
| EP | 1508144 B1 | 6/2006 |
| EP | 1679561 A2 | 7/2006 |
| EP | 0817201 B1 | 2/2007 |
| EP | 1798608 A1 | 6/2007 |
| GB | 2387664 A | 10/2003 |
| GB | 2403864 A | 1/2005 |
| GB | 2412006 A | 9/2005 |
| GB | 2412007 A | 9/2005 |
| JP | 2003-043904 A | 2/2003 |
| JP | 2004272268 A | 9/2004 |
| JP | 2007-025399 A | 2/2007 |
| JP | 2007-027517 A | 2/2007 |
| JP | 2007101939 A | 4/2007 |
| JP | 2007141426 A | 6/2007 |
| JP | 2007212221 A | 8/2007 |
| JP | 2007256949 A | 10/2007 |
| JP | 2008203895 A | 9/2008 |
| JP | 2008226434 A | 9/2008 |
| JP | 2008250337 A | 10/2008 |
| WO | 9302372 A1 | 2/1993 |
| WO | 9404956 A1 | 3/1994 |
| WO | 9534008 A1 | 12/1995 |
| WO | WO 9702557 A1 * | 1/1997 |
| WO | 9938050 A1 | 7/1999 |
| WO | 0142861 A1 | 6/2001 |
| WO | 0145943 A2 | 6/2001 |
| WO | 0229487 A1 | 4/2002 |
| WO | 0229500 A1 | 4/2002 |
| WO | 03012782 A1 | 2/2003 |
| WO | 03014178 A1 | 2/2003 |
| WO | 03018309 A1 | 3/2003 |
| WO | 03019239 A2 | 3/2003 |
| WO | 03021358 A1 | 3/2003 |
| WO | 03023519 A1 | 3/2003 |
| WO | 03034155 A1 | 4/2003 |
| WO | 03048869 A2 | 6/2003 |
| WO | 03065129 A2 | 8/2003 |
| WO | 03088234 A1 | 10/2003 |
| WO | 03102693 A1 | 12/2003 |
| WO | 03102959 A1 | 12/2003 |
| WO | 2004038515 A2 | 5/2004 |
| WO | 2004066034 A2 | 8/2004 |
| WO | 2005006777 A2 | 1/2005 |
| WO | 2005010623 A2 | 2/2005 |
| WO | 2005047988 A1 | 5/2005 |
| WO | 2005052926 A1 | 6/2005 |
| WO | 2005088781 A2 | 9/2005 |
| WO | 2005088785 A1 | 9/2005 |
| WO | 2006093846 A2 | 9/2006 |
| WO | 2006093945 A2 | 9/2006 |
| WO | 2006100472 A1 | 9/2006 |
| WO | 2006125079 A2 | 11/2006 |
| WO | 2006130391 A2 | 12/2006 |
| WO | 2007015073 A2 | 2/2007 |
| WO | 2007031715 A2 | 3/2007 |
| WO | 2007044685 A2 | 4/2007 |
| WO | 2007103340 A2 | 9/2007 |
| WO | 2007103569 A2 | 9/2007 |
| WO | 2007107752 A1 | 9/2007 |
| WO | 2007124459 A2 | 11/2007 |
| WO | 2007125347 A2 | 11/2007 |
| WO | 2008017063 A2 | 2/2008 |
| WO | 2008027882 A2 | 3/2008 |
| WO | 2008042552 A2 | 4/2008 |
| WO | 2008057646 A2 | 5/2008 |
| WO | 2008121158 A1 | 10/2008 |
| WO | 2008125199 A1 | 10/2008 |

| | | | |
|---|---|---|---|
| WO | 2008125200 | A1 | 10/2008 |
| WO | 2008125201 | A1 | 10/2008 |
| WO | 2008125202 | A1 | 10/2008 |
| WO | 2008125229 | A1 | 10/2008 |
| WO | 2009009182 | A1 | 1/2009 |
| WO | 2009054709 | A2 | 4/2009 |

OTHER PUBLICATIONS

Vasily A. Ezhov, "3D Displays: Fundamental Physical Classification for Clarifying Inherent Technical Features", EuroDisplay 2007, S7-1, pp. 124-127.
Vasily A. Ezhov, Vladimir A. Brezhnev, Sergey A. Studentsov, "Glasses-Free Stereoscopic Displays Based on Shutters and Dynamic Polarizers with Moving Boundaries Between Areas with Complementary Optical Properties", EuroDisplay 2007, P-68, pp. 449-452.
Vasily A. Ezhov, "A New Approach to Stereoscopic Display Developed by Solving the General Equation of Light Polarization", EuroDisplay 2007, P-67, pp. 445-449.
"Miracube 3D+2D Flat Planel Video Displays", http://www.3dimagetek.com/3Ddisplays.htm, pp. 1-3.
Letter re: communication related to office filing receipt error; Corrected Filing Receipt for U.S. Appl. No. 11/870,442, dated Nov. 7, 2007, 8 pages.
Stanislovas Zacharovas, Advances in digital holography, pp. 1-11.
Kyongsik Choi and Byoungho Lee, "Design and feasibility test for directional diffractive optical elements for LCD-based stereoscopic systems", Stereoscopic Displays and Virtual Reality Systems XI, edited by Andrew J. Woods, John W. Merritt, Stephen A. Benton, Mark T. Bolas, Proc. of SPIE—IS&T Electronic Imaging, SPIE vol. 5291, 2004, pp. 396-406.
David Trayner, Edwina Orr, "Autostereoscopic display using holographic optical elements", SPIE vol. 2653, pp. 65-74.
Jeremy R. Cooperstock and Guangyu Wang, "Stereoscopic Display Technologies, Interaction Paradigms, and Rendering Approaches for Neurosurgical Visualization", Stereoscopic Displays and Applications XX, edited by Andrew J. Woods, Nicolas S. Holliman, John O. Merritt, Proceedings of SPIE—IS&T Electronic Imaging, SPIE vol. 7237, 723703, 2009, pp. 1-11.
Stanislovas Zacharovas, "Autostereoscopic Projector and Display Screen", pp. 1-5.
Computer Graphics World, vol. 31, Issue 6, Jun. 2008, http://www.cgw.com/ME2, pp. 1-6.
Computer Graphics World, vol. 31, Issue 7, Jul. 2008, http://www.cgw.com/ME2, pp. 1-7.
David Brotherton-Ratcliffe, "Large Format Digital Colour Holograms Produced using RGB Pulsed Laser Technology", pp. 1-12.
B.J. Chang, "Dichromated gelatin holograms and their applications", reprinted from Optical Engineering, vol. 19(5), Sep./Oct. 1980, pp. 642-648.
Stephan Reichelt, Hagen Sahm, Norbert Leister and Armin Schwerdtner, "Capabilities of diffractive optical elements for real-time holographic displays", Practical Holography XXII: Materials and Applications, edited by Hans I. Bjelkhagen, Raymond K. Kostuk, Proc. of SPIE vol. 6912, 69120P, 2008, pp. 1-11.
Xiang Yang, Jiang Huilin, Hu Jiasheng, "The Optical Design of Stereo Endoscope", ICO20: Optical Design and Fabrication, edited by James Breckinridge, Yongtian Wang, Proc. of SPIE vol. 6034, 60340S, 2006, pp. 1-6.
Christo G. Stojanoff, "Engineering applications of HOEs manufactured with enhanced performance DCG films", pp. 1-15.
http://www.geola.com, optical components, Ultra fine grain emulsion: PFG-03C (panchromatic), pp. 1-3.
http://www.slavich.com/faq_main.htm, pp. 1-6.
http://www.geola.com, R G B Pulsed Lasers—Alpha Series, pp. 1-2.
http://www.geola.lt/eng/holo_history.htm, Four-dimensional prints, pp. 1-2.
E-mail from HnsBjlkhgn@aol.com to jcf@intrepidworld.com, re: definition of HOE and DOE.

H.I. Bjelkhagen, D. Vukicevic, "Lippmann color holography in a single-layer silver-halide emulsion", reprinted from Display Holography, T.H. Jeong, editor, Proc. SPIE vol. 2333, 1996, pp. 34-48.
Hans I. Bjelkhagen, "New recording materials for holography", pp. 1-12.
H.I. Bjelkhagen, D. Vukicevic, "Investigation of silver halide emulsions for holography", reprinted from Holographic Imaging and Materials, T.H. Jeong, editor, Proc. SPIE vol. 2043, 1994, pp. 20-30.
http://www.fou.uib.no/fd/1996/h/404001/kap02.htm, Chapter 2: Holographic methods, pp. 1-11.
http://www.answers.com/topic/holographic-optical-element.
http://harlie.gsfc.nasa.gov/HOES/HOEs.htm.
Luis M. Murillo-Mora, Hideaki Honma and Fujio Iwata, "Hologram technology in the display field", Practical Holography XX: Materials and Applications, edited by Hans I. Bjelkhagen, Roger A. Lessard, Proc. of SPIE vol. 6136, 6136OW, 2006, pp. 1-6.
"How to Develop PFG-03C (Color) Emulsion for Reflection Holographs—An Overview", Integraf LLC, 2006, pp. 1-2.
P. Hariharan, "Holographic recording materials: recent developments", reprinted from Optical Engineering, vol. 19 (5), Sep./Oct. 1980, pp. 636-641.
Joseph E. Gortych, Harold Abilock, "Managing and directing innovation in the holography business", Practical Holograph XX: Materials and Applications, edited by Hans I. Bjelkhagen, Roger A. Lessard, Proc. of SPIE vol. 6136, 613605, 2006, pp. 1-14.
Tibor Balogh, "The HoloVizio System", Stereoscopic Displays and Virtual Reality Systems XIII, edited by Andrew J. Woods, Neil A. Dodgson, John O. Merritt, Mark T. Bolas, Ian E. McDowall, Proc. of SPIE—IS&T Electronic Imaging, SPIE vol. 6055, 60550U, 2006, pp. 1-12.
Website—Custom Consulting Services, pp. 1-3.
Ietegraf LLC website, http://www.holokits.com, pp. 1-2.
Nadya Reingand, David Hunt, "Intellectual property analysis of holographic materials business", Practical Holography XX: Materials and Applications, edited by Hans I. Bjelkhagen, Roger A. Lessard, Proc. of SPIE vol. 6136, 613606, 2006, pp. 1-13.
Joseph E. Gortych, "Intellectual property licensing issues in the holography business", Practical Holography XX: Materials and Applications, edited by Hans I. Bjelkhagen, Roger A. Lessard, Proc. of SPIE vol. 6136, 613607, 2006, pp. 1-17.
David Brotherton-Ratcliffe, "Large Format Digital Colour Holograms Produced using RBG Pulsed Laser Technology", pp. 1-12.
Neil A. Dodgson, "On the number of viewing zones required for head-tracked autostereoscopic display", Stereoscopic Displays and Virtual Reality Systems XIII, edited by Andrew J. Woods, Neil A. Dodgson, John O. Merritt, Mark T. Bolas, Ian E. McDowell, Proc. of SPIE—IS&T Electronic Imaging, SPIE vol. 6055, 60550Q, pp. 1-12.
Press Release, Feb. 24, 2005, Wales' Growing Opto-Electronics Sector Will Reap Benefits from Latest Technium, pp. 1-7.
Manuel Ulibarrena, "A new panchromatic silver halide emulsion for recording color holograms", Holographer.org, Jan. 2004, pp. 1-12.
William R. Graver, James W. Gladden, and John W. Eastes, "Phase holograms formed by silver halide (sensitized) gelatin processing", reprinted from Applied Optics, vol. 19(9), May 1, 1980, pp. 1529-1536.
http://www.rabbitholes.com/faq.html, "RabbitHoles Frequently Asked Questions", pp. 1-3.
Karen McMenemy and Stuart Ferguson, "Real-Time Stereoscopic Video Streaming", CMP Media LLC, 2005, pp. 1-5.
R. Haussler, S. Reichelt, N. Leister, E. Zschau, R. Missbach, A. Schwerdtner, "Large real-time holographic displays: from prototypes to a consumer product", Stereoscopic Displays and Applications XX, edited by Andrew J. Woods, Nicolas S. Holliman, John O. Merritt, Proceedings of SPIE—IS&T Electronic Imaging, SPIE vol. 7237, 72370S, 2009, pp. 1-9.
Hans I. Bjelkhagen, "Silver halide emulsions for Lippmann photography and holography", reprinted from International Symposium on Display Holography, T.H. Jeong, editor, Proc. SPIE vol. 1600, 1991, pp. 44-59.
The SilverCross Project brochure, www.silvercrossproject.org, 2 pages.
http://www.silvercrossproject.org/Consortium.htm, pp. 1-2.

The SilverCross Project D4-Project newsletter (Feb. 2005), pp. 1-4.
International Search Report as mailed Apr. 28, 2010 in PCT/US10/26497.
Zacharovas, Stanislovas, Advances in Digital Holography, Geola Digital uab, Naugarduko str. 41, LTU-03227, Vilnius, Lithuania.
The SilverCross Project D11—Project Newsletter (Oct. 2005), pp. 1-4.
Website—http://www.slavich.com "Emulsions for Holography", pp. 1-3.
Pamphlet—"Emulsions for Holography", pp. 1-8.
Website—http://www.holosphere.ru/new_first.htm, Sphere-S Ltd.
V.A. Ezhov, S.A. Studentsov, Volume (or stereoscopic) images on the screens of standard computer and television displays, Current Research on Image Processing for 3D Information Displays, edited by Vladimir V. Petrov, Proceedings of SPIE vol. 5821, 2005, pp. 102-116.
Stanislovas Zacharovas, Ramunas Bakanas, Evgenij Kuchin, "Autostereoscopic Projector and Display Screens", Stereoscopic Displays and Applications XX, edited by Andrew J. Woods, Nicolas S. Holliman, John E. Merritt, Proceedings of SPIE—IS&T Electronic Imaging, SPIE vol. 7237, 72370V, 2009, pp. 1-7.
Michael Starks Professional Bio, pp. 1-35.
Pierre St. Hilaire, Stephen A. Benton, and Mark Lucente, "Synthetic aperture holography: a novel approach to three-dimensional displays", J. Opt. Soc. Am. A, vol. 9, No. 11, Nov. 1992, pp. 1969-1977.
Lenny Lipton, Mark Feldman, "A new autostereoscpic display technology: The SynthaGram", Stereoscopic Displays and Virtual Reality Systems IX, Andrew J. Woods, John O. Merritt, Stephen A. Benton, Mark T. Bolas, Editors, Proceedings of SPIE vol. 4660, 2002, pp. 229-235.
Grace M. Bochenek, Thomas J. Meitzler, Paul Muench, and Kimberly Lane, "Design and Perception Testing of a Novel 3-D Autostereoscopic Holographic Display System", Part of the IS&T/SPIE Conference on Stereoscopic Displays and Applications X—Jan. 1999, SPIE vol. 3639, pp. 99-109.

* cited by examiner

US 8,284,234 B2

ENDOSCOPIC IMAGING USING REFLECTION HOLOGRAPHIC OPTICAL ELEMENT FOR AUTOSTEREOSCOPIC 3-D VIEWING

CROSS-REFERENCE TO RELATED APPLICATION

This application is a continuation-in-part of U.S. patent application Ser. No. 12/408,447 filed Mar. 20, 2009, the disclosure of which is incorporated by reference in its entirety.

BACKGROUND

1. Technical Field

The present disclosure relates to systems and methods for creating and displaying autostereoscopic three-dimensional images from an endoscope using a reflection holographic optical element.

2. Background Art

Sterescopic display devices separate left and right images corresponding to slightly different views or perspectives of a three-dimensional scene or object so that they can be directed to a viewer's left and right eye, respectively. The viewer's visual system then combines the left-eye and right-eye views to perceive a three-dimensional or stereo image. A variety of different strategies have been used over the years to capture or create the left and right views, and to deliver or display them to one or more viewers. Stereoscopic displays often rely on special glasses or headgear worn by the user to deliver the corresponding left and right images to the viewer's left and right eyes. These have various disadvantages. As such, a number of strategies have been, and continue to be, developed to provide autostereoscopic displays, which deliver the left and right images to corresponding eyes of one or more viewers without the use of special glasses or headgear.

Real-time medical imaging applications for diagnosis, treatment, and surgery have traditionally relied on equipment that generates two-dimensional images. For example, various types of endoscopy or minimally invasive surgery use an endoscope or similar device having a light source and camera to illuminate and provide a real-time image from within a body cavity. For some applications, special headgear or glasses have also been used to create a real-time three-dimensional view using stereo images. However, glasses or headgear may cause fatigue and/or vertigo in some individuals after extended viewing times due to visual cues from peripheral vision outside the field of view of the glasses or headgear.

One of the historical approaches for displaying an autostereoscopic image has been to use a parallax barrier. This method uses interlaced left and right images and places a layer of material with very fine slits at a precise distance from the image plane of a flat panel display (typically LCD), relying on parallax to separate right-eye and left-eye viewing perspectives so that each eye sees the corresponding left/right image. However, horizontal resolution and light output are adversely impacted with this approach, and the "sweet spot", or zone where one can best visualize a stereoscopic image, is very small.

Another attempt at providing an autostereoscopic image is described in U.S. Pat. No. 6,985,765 to Morita, et al. that uses a Fresnel lens to direct reflected light from left and right stereo video sources to corresponding left-eye and right-eye viewing locations. While the use of a Fresnel lens enables lower volume and weight for large aperture, short focal length lenses, image quality or resolution is reduced. As such, three-dimensional imaging systems based on parallax barriers and Fresnel lenses, as well as those using lenticular sheets, have generally fallen short of user expectations.

SUMMARY

Systems and methods for creating a three-dimensionally perceived image unaided by glasses or headgear include one embodiment of an endoscopic imaging apparatus with a stereo endoscope for providing at least first and second video signals corresponding to first and second perspectives of an object, a reflection holographic optical element that reconstructs rays of incident light to form at least first and second viewing zones corresponding to first and second azimuthal angles of incidence of the rays of light on the reflection holographic optical element, a first projector for projecting an image corresponding to the first video signal at a first azimuthal angle and first altitudinal angle onto the reflection holographic optical element, and a second projector for projecting an image corresponding to the second video signal at a second azimuthal angle and the first altitudinal angle onto the reflection holographic optical element. The apparatus may also include a head tracking system that synchronizes movement of the at least first and second viewing zones with movement of a viewer's eyes. In one embodiment, the head tracking system comprises a motor-controlled rotary stage that rotates the reflection holographic optical element, the first projector, and the second projector in response to azimuthal movement of a viewer's head. In one embodiment, the first and second projectors are disposed generally above the reflection holographic optical element with central principal rays of corresponding output lenses coaxially aligned with front-surface mirrors positioned to redirect the central principal rays to intersect at the reflection holographic optical element.

Various embodiments provide a method for creating a 3-D image of an object viewed through at least one endoscope that includes coaxially projecting first and second images from the at least one endoscope in opposite directions, redirecting rays of the first image from the at least one endoscope at a first azimuthal angle onto a reflective holographic element, redirecting rays of the second image from the at least one endoscope at a second azimuthal angle onto the reflective holographic element, and aligning the first and second images to co-illuminate the reflective holographic element such that principal rays from the first and second images substantially overlap, wherein the rays of the first image are reflected by the reflective holographic element to a first viewing zone and the rays of the second image are reflected to a second viewing zone by the reflective holographic element. The method may include moving the reflective holographic element in response to movement of a viewer to maintain position of the first and second viewing zones relative to the viewer. In one embodiment, the method includes rotating the reflective holographic element in a unitary motion with the projectors to maintain alignment of the central principal rays relative to the reflective holographic element.

In one embodiment, a method for generating an autostereoscopic three-dimensional image includes projecting first and second substantially overlapping images onto a reflection holographic element having a holographically recorded interference pattern captured within a photosensitive material, the interference pattern produced by interference between mutually coherent object and reference beams of at least one pulsed laser with the object and reference beams incident on the holographic element from opposite sides. The recording may be performed in a pixel-by-pixel fashion with overlapping exposures from coherent light at three or more wavelengths, for example, to provide desired color fidelity in the reflected images when illuminated by projectors having similar wavelength peaks. In one embodiment, the interference pattern is captured in a master holographic plate having a photo-sensitive emulsion deposited on a substrate (such as glass or triacetate film), which is subsequently chemically processed using a developing and bleaching process to remove a portion of the emulsion. The remaining emulsion forms a desired master plate that may be used as the holographic element in the autostereoscopic display, or may be copied by known techniques, depending on the particular application and implementation.

A system for generating a three-dimensionally perceived image by at least one observer includes, in one embodiment, a stereo endoscope having left and right cameras, a reflection holographic optical element, a boom fixed relative to the reflection holographic optical element and extending over and away from the reflection holographic optical element, a left projector and a right projector secured to the boom and disposed with output lenses generally coaxially aligned in opposite directions and projecting corresponding left and right images received from the left and right cameras of the stereo endoscope toward corresponding left and right mirrors positioned to align principal rays from the left and right projectors on the reflection holographic element, the holographic optical element redirecting light from the left projector to a left eye-box and redirecting light from the right projector to a right eye-box for viewing by left and right eyes of an observer to create a three-dimensionally perceived image without glasses or optical headgear. An eye/head tracking system controls a rotary stage to rotate the boom and the reflection holographic optical element in response to observer movement detected by an infrared camera and processed by facial recognition software that generates command signals to control the rotary stage such that the observer's eyes remain within corresponding left and right eye-boxes.

Embodiments according to the present disclosure have various associated advantages. For example, embodiments of the present disclosure provide real-time stereo images to corresponding eyes of at least one viewer to produce a three-dimensionally perceived image without viewing aids, such as glasses or headgear. The present disclosure provides real-time viewer position detection and image display synchronization to allow the viewer to move while staying within predetermined eye-boxes so that perception of the three-dimensional image is unaffected by viewer movement. Use of a reflection holographic element provides higher resolution and improves color fidelity of reflected images, both of which are desirable for endoscopic viewing applications.

The above advantages and other advantages and features will be readily apparent from the following detailed description of the preferred embodiments when taken in connection with the accompanying drawings.

DETAILED DESCRIPTION OF EMBODIMENT(S)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to an autostereoscopic display system and method capable of displaying a stereo image in real-time using either live stereo video input from a stereo endoscope, or a standard video input processed to generate simulated stereo video that is perceived as a three-dimensional image by a properly positioned viewer.

Figure 1:
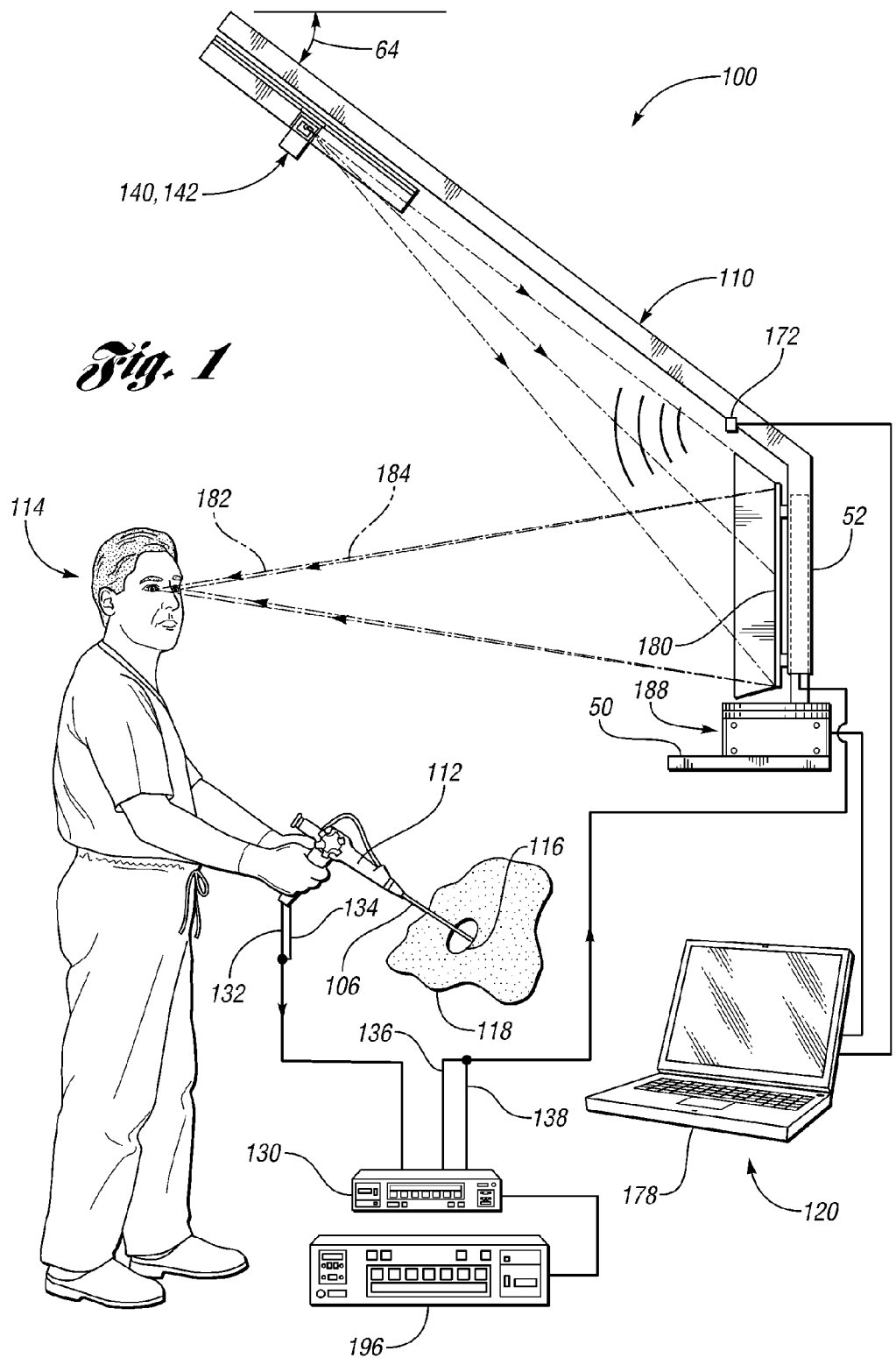
FIG. 1 illustrates operation of a system or method for reflective autostereoscopic display of an endoscopic image for three-dimensional perception by a viewer according to one embodiment of the present disclosure.

FIG. 1 schematically illustrates a system or method for producing a three-dimensional endoscopic image via a reflection holographic optical element of an autostereoscopic display according to embodiments of the present disclosure. Apparatus 100 includes a display system 110 for projecting an autostereoscopic image captured from a stereo endoscope 112 so that user 114 perceives a three-dimensional image of the interior of a cavity 116 of a body 118 or other object unaided by special glasses or optical headgear. Stereo endoscope 112 may provide left video 132 and right video 134 to a video processor 130, or directly to display system 110, depending on the particular application and implementation. Video signal processor 130 may combine or encode the stereo video signals into a multiplexed signal for display on a local or remote auxiliary screen (not shown) and/or for recording on a recording device 196, such as a VCR, DVD, or DVR, for example.

In one embodiment, video processor 130 is implemented by a stereo encoder/decoder commercially available from 3-D ImageTek Corp. of Laguna Niguel, Calif. and combines the two stereo input signals into a single field-multiplexed output video signal, or vice versa. Video signal processor 130 may also include a pass-through mode where video feeds 132, 134 pass through to output feeds 136, 138 without any signal multiplexing, but may provide noise filtering, amplification, or other functions, for example, between the stereo inputs and corresponding stereo outputs.

As also shown in FIG. 1, stereo video output signal lines 136, 138 are provided to at least two associated projectors 140, 142 (best shown in FIGS. 2-3) of display system 110. Projectors 140, 142 project corresponding images in real-time to focus substantially co-extensive overlapping images on a reflection holographic optical element 180. Holographic element 180 is sometimes referred to as a "screen" even though the resulting three-dimensional image perceived by the viewer may appear in front of and/or behind the element. Holographic element 180 reflects light projected thereon from projector 140 to a first viewing zone or eye-box 182 and light projected thereon from projector 142 to a second viewing zone or eye-box 184. When viewer 114 is properly positioned, each eye will see only one of the images of a corresponding eye-box. The slightly different perspective provided by each image (also known as horizontal parallax) is combined by the visual processing of the viewer's brain and the viewer perceives a three-dimensional image of the interior of cavity 116 as captured by a stereo imaging system within tube 106 of stereo endoscope 112 as illustrated and described with reference to FIG. 5.

Figure 2:
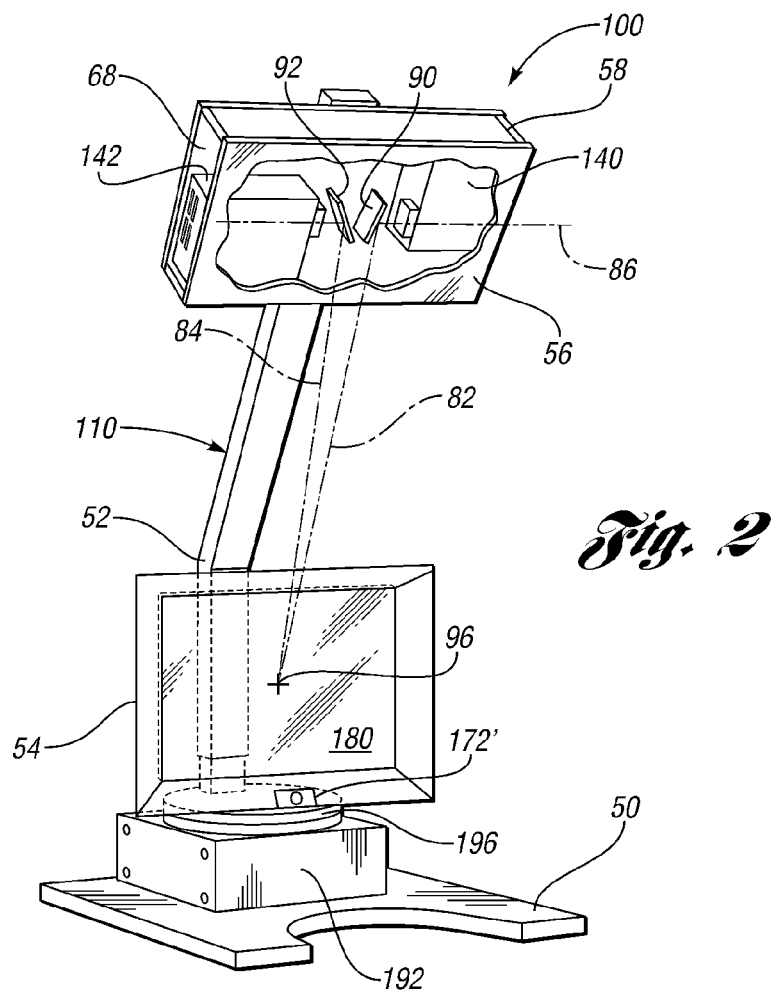
FIG. 2 is a front view of an endoscopic viewing apparatus using a reflection holographic optical element according to one embodiment of the present disclosure.

In the embodiment illustrated in FIGS. 1 and 2, display system 110 includes a fixed base 50 having the base 192 of a computer-controlled actuator 188 (FIG. 4) secured thereto. In this embodiment, a riser/boom assembly 52 is secured to a rotary stage 196 of actuator 188 to provide eye/head tracking as described herein. Reflective holographic element 180 is secured directly or indirectly to riser and boom 52 such that it is generally vertically positioned. An optional viewing shield 54 surrounds the perimeter of reflection holographic optical element 180 and extends generally outward toward viewer 114, with each side forming an obtuse angle with the plane of reflection holographic optical element 180 to provide a desired field of view. Projectors 140, 142 are directly or indirectly secured to boom 52. In one embodiment, projectors 140, 142 are secured to a mounting plate 56, which is secured via posts 58 and cover 68 to boom 52. In this embodiment, boom 52 forms an altitudinal angle 64 of about 38 degrees. However, the desired angle may vary based on the particular angles used to produce element 180 as known in the holographic optical element art. In general, it is desirable to project light from projectors and any associated optic elements at an altitudinal angle of about 45 degrees below horizontal with the boom angle adjusted accordingly based on the particular optics and mounting plate arrangement.

System 100 may also include a head tracking subsystem 120 that synchronizes or aligns movement of viewer 114 with reflection holographic element 180 and projectors 140,142 to maintain alignment of the stereoscopic viewing zone corresponding to the left eye-box 182 and right eye-box 184. Head/eye tracking subsystem 120 may include a computer controller actuator 188, implemented by a rotary stage in this embodiment, to move eye-boxes 182, 184 in response to movement of viewer 114. In the embodiment illustrated in FIG. 1, means for moving eye-boxes 182, 184 includes means for moving display system 110, which includes projectors 140, 142 and associated optics secured to mounting plate 56, which in turn is secured to boom 52. Of course, other types of actuators may be used alone or in combination to provide up to six degrees of freedom, depending upon the particular application and implementation, i.e. the means for moving display system 110 may be implemented by a single or multi-axis microprocessor controlled actuator 188. In the embodiment illustrated, the means for moving projectors 140, 142 and reflection holographic element 180 corresponds to actuator 188, which includes a base 192, stepper motor 194, and rotary stage 196 with stepper motor and controller 194 commanded by control logic or software executed by a computer 178. The means for detecting movement of viewer 114 may include computer 178, which communicates with motor/controller 194 and an infrared sensor/camera 172 with computer 178 generating commands to rotate stage 196 in response to changes in position of viewer 114.

Infrared camera/sensor 172 (172') may be mounted on boom 52 above screen 180 as shown in FIG. 1, or below screen 180 as shown in FIG. 2, for example. In one embodiment, camera/sensor 172 is a commercially available camera employing a CMOS sensor sensitive in the near-IR region, such as the Firefly MV digital camera available from Point Grey Research (ptgrey.com). The camera is positioned to capture a facial image of viewer/observer 114 with the image processed by facial recognition software to detect eye/head movement and control the eye/head tracking actuator 188 as described in greater detail with respect to FIG. 6.

Figure 3:
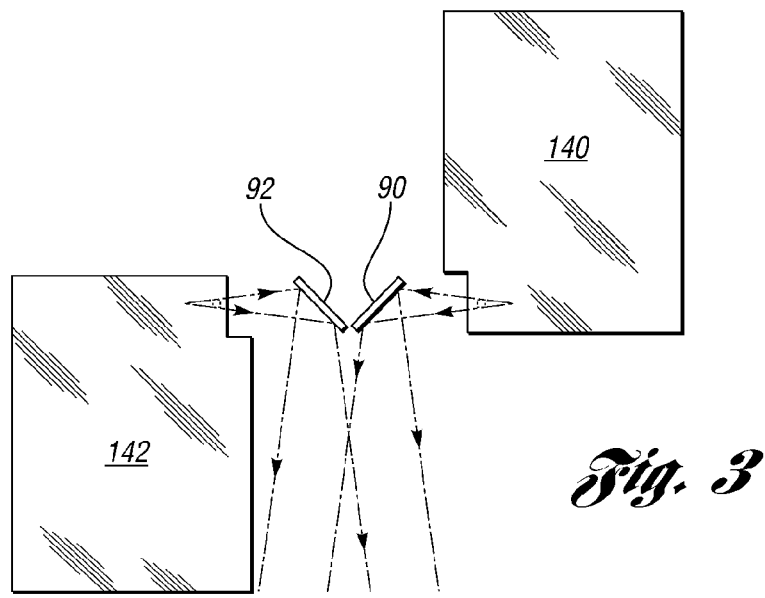
FIG. 3 is a plan view that illustrates positioning of first and second projectors with central principal rays coaxially aligned and propagating in opposite directions according to one embodiment of the present disclosure.

FIGS. 2 and 3 illustrate positioning of projectors 140, 142 and associated optics for one embodiment of an autostereoscopic display using a reflection holographic optical element according to the present disclosure. In the illustrated embodiment, projectors 140, 142 are implemented by commercially available projectors, such as the CASIO XJ-S57 available from Casio Computer Co., Ltd., or similar projectors. These projectors incorporate a DLP projection system with a 210 W high-pressure mercury lamp and can provide a XGA resolution of 1024×768 pixels. These also include various embedded color correction, focusing, and keystone correction functions that may be used for various image adjustments so that the images projected on reflection holographic optical element 180 are substantially rectangular and co-extensive or completely overlapping with right-angle corners to provide desired color fidelity and image registration between the left and right images seen by viewer 114. Of course, the selected projector characteristics may vary depending upon the particular application and implementation.

As generally illustrated in the perspective view of FIG. 2, projectors 140, 142 are secured to mounting plate 56 in an offset arrangement, best illustrated in the plan view as of FIG. 3, such that central principal rays 82, 84 of the images output by projectors 140, 142, respectively, are coaxially aligned along axis 86 and propagate in opposite directions. The coaxially projected rays corresponding to a first image projected from first projector 140 and a second image projected from second projector 142 are redirected by associated first mirror 90 and second mirror 92, which are also secured to mounting plate 56, preferably by an adjustable mount. In the illustrated embodiment, mirrors 90, 92 are implemented by commercially available first-surface aluminum coated float glass optical quality mirrors with reflection in the visible wavelengths of 90-95%, for example. Mirrors 90, 92 are positioned to align the first and second images to co-illuminate the reflective holographic element 180 such that central axis or principal rays 82, 84 from the first and second images intersect or substantially overlap at element 180 at a known calibration point 96, which is positioned near the center of element 180 in this embodiment.

As will be appreciated by those of ordinary skill in the art, light projected from projectors 140, 142 and reflected from mirrors 90, 92 exits at substantially the same altitudinal angle (out of the plane of the paper) based on the angle of boom 52 and mounting plate 56 relative to the output lenses of the projectors. However, projectors 140, 142 and/or mirrors 90, 92 are positioned such that the incident azimuthal angle of light projected on reflection holographic element 180 is slightly different so that element 180 reflects the light to a selected light box or viewing zone based on the angle of incidence. The reflection holographic element performs angle selectivity so that ideally only the light incident from the first projector is reflected to the first viewing zone and only light incident from the second projector is reflected to the second viewing zone even though both the first and second images co-illuminate element 180. Of course, in practice various factors may contribute to some light from the first projector being diffracted to the second viewing zone and vice versa, which is undesirable and degrades the quality of the three-dimensional image perceived by observer 114.

Figure 4:
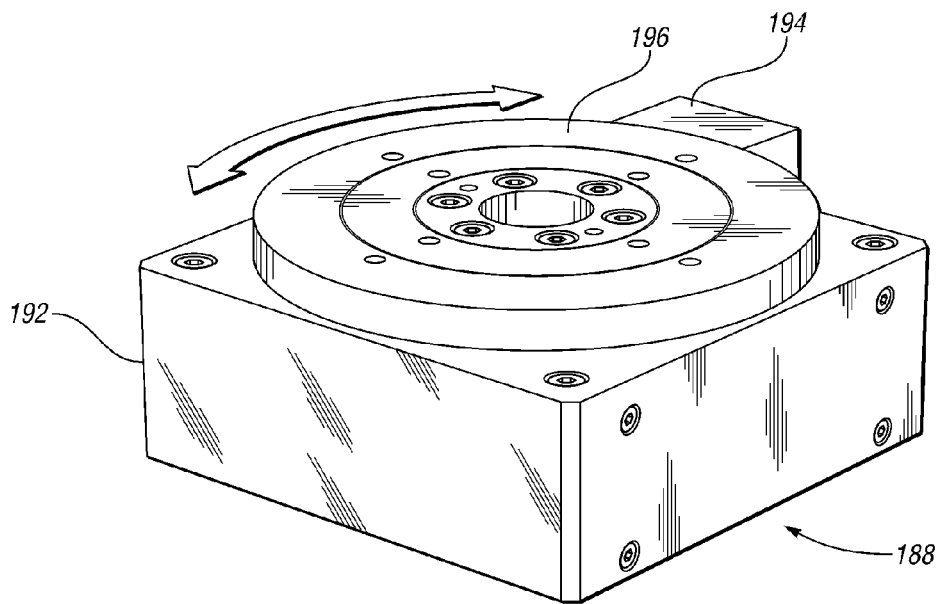
FIG. 4 illustrates a single-axis computer controlled actuator for positioning the reflection holographic element and first and second projectors in response to viewer movement according to one embodiment of the present disclosure.

Referring now to FIG. 4, a perspective view of a representative computer-controlled actuator 188 for use in a head/eye tracking system of an autostereoscopic display for viewing three-dimensional endoscopic images according to the present disclosure is shown. While a single-axis actuator is illustrated, those of ordinary skill in the art will recognize that multi-axis actuators could be used to synchronize movement of eye-boxes 182, 184 with movement of viewer 114. In this embodiment, actuator 188 includes a stationary base 192 with a rotatable stage or platform 196 that may be direct-driven or belt-driven by, for example, a stepper motor/controller 194. In one representative embodiment, system 100 includes a precision rotary stage, which is commercially available from Newmark Systems, Inc of Mission Viejo, Calif. (Model RM-8). Rotatable state or platform 196 is secured to boom 52 to rotate screen 180, shield 54, and projectors 140, 142 in response to commands generated by computer 178 based on a change in position of observer 114 as indicated by images captured by camera 172 and processed by commercially available facial feature recognition software, such as the faceAPI toolkit available from Seeing Machines, Limited (seeingmachines.com), for example.

Figure 5:
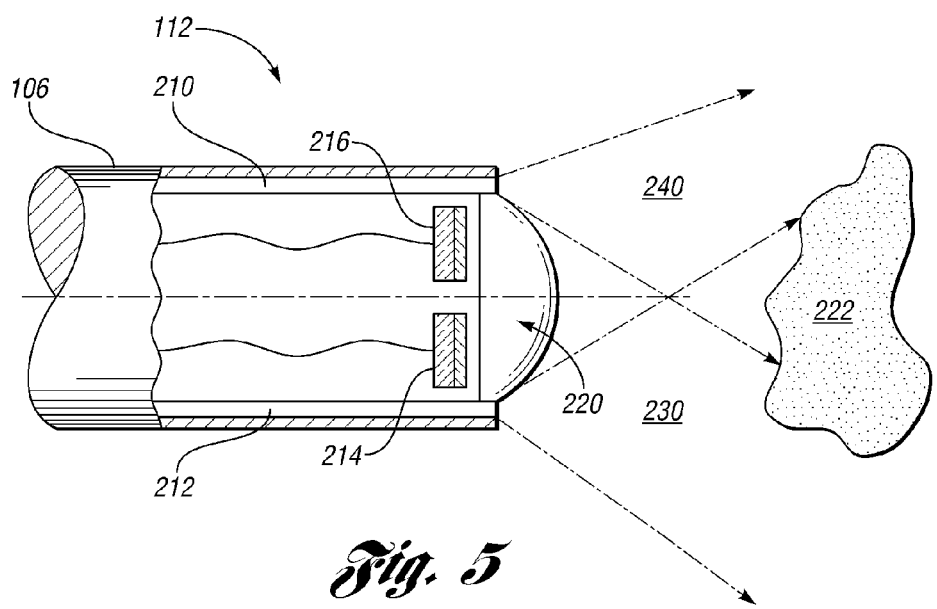
FIG. 5 is a partial cross-sectional view of an endoscope having at least two cameras, a light source, and imaging optics for three-dimensional viewing of an image according to one embodiment of the present disclosure.

Referring now to FIG. 5, a partial cross-section of the leading end of a representative stereo endoscope for use in embodiments of an apparatus or method according to the present disclosure is shown. Stereo endoscope 112 (FIG. 1) may include a tube 106 and an annular light delivery system having one or more optic fibers 210, 212 to illuminate a distal end of tube 106 as generally represented by areas 230 and 240 for viewing an object or anatomical site of interest 222 being inspected. Light reflected from object 222 is collected and imaged by one or more cameras 214, 216 that may be optically coupled by a lens or lens system 220, which is at least partially disposed within tube 106. Lens system 220 may include a single lens or multiple optical components, such as lenses, mirrors, and the like. First camera 214 and second camera 216 may also include associated optic elements to provide corresponding focused images that are converted to video signals delivered through tube 216 via wired or wireless connections for display on display system 108 as previously described.

In one embodiment of a method according to the present disclosure, a first endoscope image is captured by first camera 214 disposed within tube 106 of endoscope 112 (FIGS. 1-5) and transmitted to a first projector 140 (FIGS. 1-3) for projection onto reflective holographic optical element 180 (FIGS. 1-2) from a first angle to a first eye-box 182 (FIG. 1). The method also includes capturing a second endoscope image at substantially the same time as the first image with second camera 216 disposed within tube 106 of endoscope 112 (FIG. 1), and transmitting the second image to a second projector 142 (FIG. 1) for projection onto reflection holographic optical element 180 (FIG. 1) from a second angle to a second eye-box 184 (FIG. 1).

As illustrated in FIGS. 1-2, holographic optical element 180 is a reflection or reflective holographic optical element that may be recorded and processed using holographic techniques as known in the art and modified as described herein. For example, a suitable reflective holographic optical element 180 may be made using a digital "pixel-by-pixel" process with three or more wavelengths of coherent light generated by pulsed lasers as described in U.S. patent application Ser. No. 11/870,442 filed Oct. 11, 2007 entitled "Holographic Apparatus And System", the disclosure of which is hereby incorporated by reference in its entirety.

In general, a wide variety of materials have been used to capture/record a holographic interference pattern for subsequent use, such as photo-sensitive emulsions, photo-polymers, dichromated gelatins, and the like. The selection of a particular material/medium and corresponding recording process may vary depending upon a number of considerations. In one prototype display, the recording process described above was performed with a holographic plate including two optical quality glass (float glass) pieces each having a thickness of about 3 mm (0.125 in.) and approximately 30 cm by 40 cm in size. A silver halide emulsion having an initial thickness of about 10-12 micrometers was applied to a triacetate substrate, followed by drying and cooling, and cutting to a final size, with the coated film placed between the glass plates.

According to embodiments of the present disclosure, the photosensitive material is a nano-structured silver halide emulsion having an average grain size of 10 nm, such as the commercially available PFG-03C holographic plates, for example. Such film/emulsions/plates are commercially available from Sphere-s Co, Ltd. company located in Pereslazl-Zalessky, Russia.

Another suitable emulsion has been developed by the European SilverCross Consortium, although not yet commercially available. Similar to the PFG-03C material, the emulsion developed by the European SilverCross Consortium is a nano-structured silver halide material with an average grain size of 10 nm in a photographic gelatin having sensitizing materials for a particular laser wavelength or wavelengths. In general, the finer the particles, the higher efficiency and better resolution in the finished screen, but the less sensitive the material is to a particular laser frequency, which results in higher power density and generally longer exposure times. The photo-sensitive emulsion may be sensitized using dyes during manufacturing to improve the sensitivity to the frequency doubled and/or tripled wavelengths of the laser used during the recording process.

After the holographic plate has been exposed, it is developed using generally known techniques that include using a suitable developer for fine-grain material, using a bleaching compound to convert the developed silver halide grains into a silver halide compound of a different refractive index than the surrounding gelatin matrix, and washing and drying. The emulsion and processing/developing process should be selected so that there is minimal or no shrinkage of the emulsion during processing. Alternatively, the shrinkage may be controlled to match the resulting shifted wavelengths to those of the projectors used to illuminate the plate. In one embodiment, the SM-6 developing process was used. Depending on the particular application, a panchromatic photopolymer could be used rather than a silver halide emulsion.

The illustrated embodiment of system 100 incorporates a reflective element 180 (FIG. 1) with light from at least two projectors 140, 142 shining from generally above element 180 (relative to viewer 114) and being diffracted by element 180 to corresponding left/right eye-boxes 182, 184 or viewing zones to create the image perceived as a three-dimensional image by viewer 114. Element 180 functions to diffract incident light from first projector 140 positioned at a first azimuthal angle of incidence relative to element 180 to a first eye-box 182 or viewing zone. Likewise, light from second projector 142 positioned at a second azimuthal angle of incidence relative to element 180 is projected onto element 180 and is diffracted toward a second eye-box 184 or viewing zone. A viewer 114 properly positioned in front of display device 108 at the viewing "sweet spot" sees only the left image 182 with the left eye and the right image 184 with the right eye. If the left image and right images are appropriately shifted one relative to the other, i.e. contain an appropriate amount of horizontal parallax, the viewer's brain combines the left and right images and the viewer 114 perceives a three-dimensional image. The horizontal parallax provides the third dimension or depth to the image, which appears in front of, within, or spanning the plane of element 180. The position of the perceived image relative to the viewing element can be controlled by appropriate positioning of the holographic plate used to create element 180 during the holographic recording process as known in the holography art. If viewer 14 moves out of the "sweet spot", the three-dimensional effect is at least partially lost and viewer 14 no longer perceives a three-dimensional image.

To reduce or eliminate loss of the three-dimensional image, head tracking system 120 attempts to synchronize movement of eye-boxes 182, 184 with movement of viewer 114 to maintain alignment of a viewer's eyes with the "sweet spot" or stereoscopic viewing zone of the display. Although numerous other head/eye tracking strategies are possible, the strategy illustrated and described herein rotates the entire display system 110, which is secured to riser/boom 52, in response to viewer movement.

As previously described, the left and right video signals provided to the left and right projectors may be captured in real-time by corresponding left and right cameras positioned within an endoscope to provide appropriate parallax. Alternatively, the left and right video signals may be generated by or modified by a video signal processor, such as processor 130 (FIG. 1) or the like, that processes a standard format video input signal captured by a single camera (two-dimensional) to create a stereo left/right output signal provided to the left/right projectors by adding horizontal parallax to the left/right video output signals. As another alternative, either or both of the left/right video input signals could be based on images generated entirely by computer, i.e. CG images.

Figure 6:
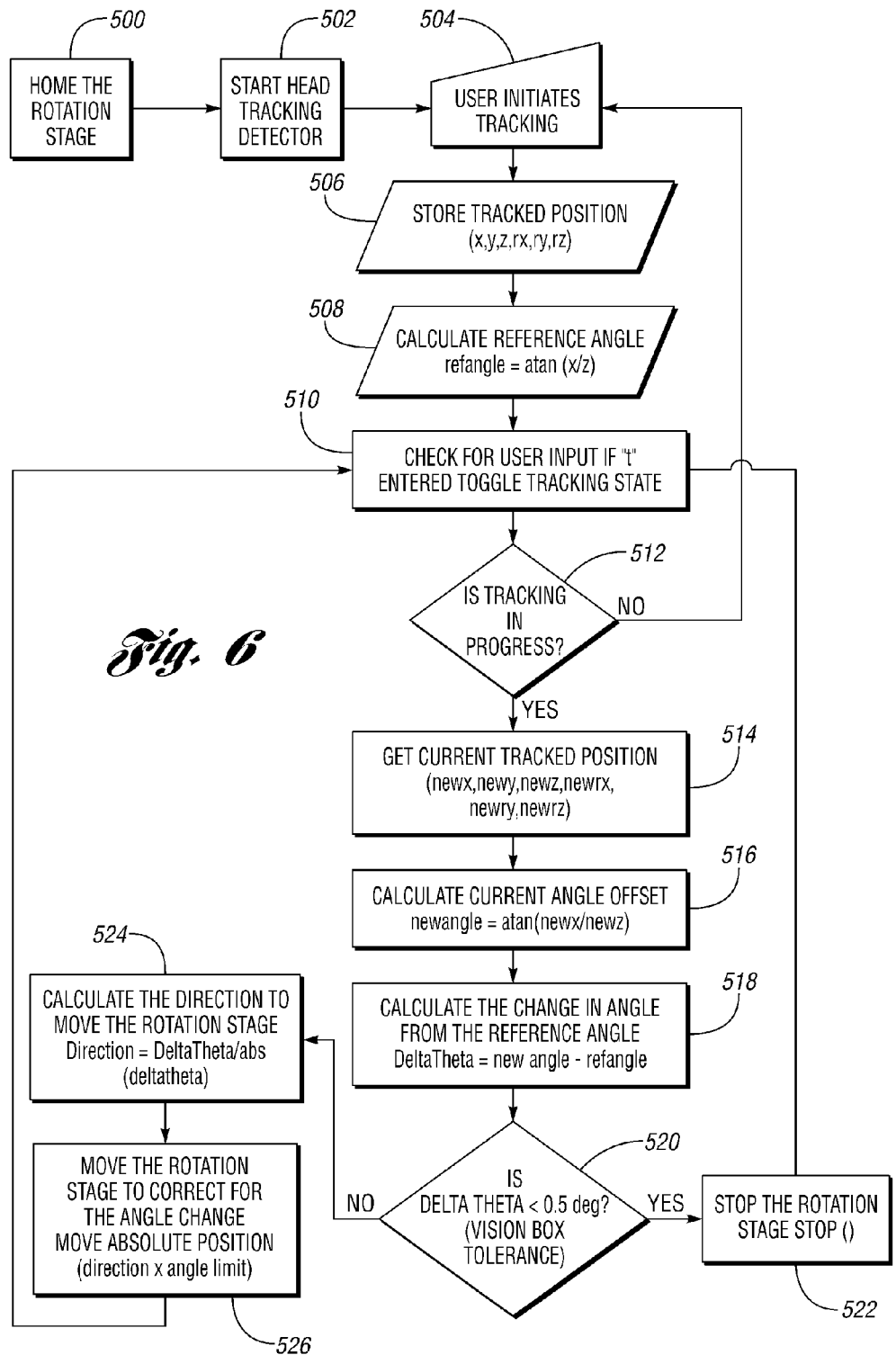
FIG. 6 is a flow diagram illustrating control logic for synchronizing the display system with viewer movement to provide a head tracking function of a system or method for three-dimensional image generation according to one embodiment of the present invention.

Referring now to FIG. 6, a block diagram illustrating operation of a viewer tracking function for use with a medical imaging system 100 according to one embodiment of the present disclosure is shown. The diagram of FIG. 6 provides a representative strategy or means for synchronizing or moving eye-boxes of an autostereoscopic display incorporating a reflective holographic optical element in response to viewer movement, which is sometimes referred to as head/eye tracking. The illustrated blocks represent a control strategy and/or logic generally stored as code or software executed by a microprocessor of a general purpose computer, such as computer 178 (FIG. 1). However, code or software functions may also be implemented in dedicated hardware, such as FPGA's, ASIC's, or dedicated micro-controllers in communication with sensor 172 and motor/controller 194. In general, various functions are implemented by software in combination with hardware, as known by those of ordinary skill in the art. Code may be processed using any of a number of known strategies such as event-driven, interrupt-driven, multi-tasking, multi-threading, and the like, depending upon the particular implementation. As such, various steps or functions illustrated may or may not be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

In the illustrated approach, commercially available facial recognition software is used to process images from camera 172 as previously described. The facial recognition software outputs distance and angle measurements for facial features of viewer 114 relative to camera 172 that are used by the tracking software of FIG. 6 to generate appropriate actuator commands for actuator 188. Block 500 of FIG. 6 represents a zeroing or homing function for actuator 188, typically performed on a system reset or during a power-on self-test (POST) procedure so that the starting position of the actuator is known. The tracking camera/sensor 172 is then initialized, as represented by block 502. The user or viewer may initiate a tracking mode via keyboard input from computer 178, for example, which results in the current position of viewer 114 being stored in memory as represented by block 506.

For the representative embodiment illustrated in FIG. 6, a reference angle is determined using only the x-axis and z-axis information generated by the facial recognition program by calculating the arc-tan(x/z) as represented by block 508. In block 510, keyboard input is monitored to determine whether to continue in tracking mode. The current tracking state (on or off) is toggled when appropriate keyboard input is received. Block 512 then determines whether tracking is in progress, i.e. whether facial features can be recognized by the image captured by camera 172. If the features are detected, then tracking is in progress and control continues with block 514. If facial features of viewer 114 move out of the field of view of camera 172 or can not otherwise be recognized, then tracking is no longer in progress and must be re-initiated by the user as represented by block 504.

The current tracked position is obtained at block 514 with a corresponding current angle offset determined at block 516 in a similar manner as described above with reference to block 508. A delta or change in angle from the previously stored reference angle is determined as represented by block 518. If the change in angle exceeds a corresponding threshold associated with the eye-box tolerance, such as 0.5 degrees, for example, then block 524 determines the direction of rotation and generates an actuator command to rotate the stage to correct for the change of angle as represented by block 526. Control then returns to block 510

If the change in angle is less than the corresponding threshold as determined by block 520, then the actuator is stopped as represented by block 522 and control continues with block 510.

As such, the present disclosure includes embodiments having various associated advantages. For example, embodiments of the present disclosure provide real-time stereo images to corresponding eyes of at least one viewer to produce a three-dimensionally perceived image without viewing aids, such as glasses or headgear. The present disclosure provides real-time viewer position detection and image display synchronization to allow the viewer to move while staying within predetermined eye-boxes so that perception of the three-dimensional image is unaffected by viewer movement. Use of a reflection holographic optical element according to the present disclosure provides high resolution and good color fidelity for endoscopic viewing applications.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. An endoscopic imaging apparatus comprising:
   a stereo endoscope for providing at least first and second video signals corresponding to first and second perspectives of an object;
   a reflection holographic optical element that reconstructs rays of incident light to form at least first and second viewing zones corresponding to first and second azimuthal angles of incidence of the rays of light on the reflection holographic optical element;
   a first projector for projecting an image corresponding to the first video signal at a first azimuthal angle and first altitudinal angle onto the reflection holographic optical element; and
   a second projector for projecting an image corresponding to the second video signal at a second azimuthal angle and the first altitudinal angle onto the reflection holographic optical element such that the reflection holographic element redirects light from the first projector to a first viewing zone and light from the second projector to a second viewing zone so that a viewer positioned with one eye in the first viewing zone and the other eye in the second viewing zone may perceive a three-dimensional image, the first and second projectors disposed generally above the reflection holographic optical element with central principal rays of corresponding output lenses coaxially aligned.

2. The endoscopic imaging apparatus of claim 1 further comprising
   a head tracking system that synchronizes movement of the at least first and second viewing zones with movement of a viewer's eyes.

3. The endoscopic imaging apparatus of claim 2 wherein the head tracking system comprises a motor-controlled rotary stage that rotates the reflection holographic optical element, the first projector, and the second projector in response to azimuthal movement of a viewer's head.

4. The endoscopic imaging apparatus of claim 1 further comprising first and second alignment minors associated with the first and second projectors for directing output light from the first and second projectors at the first altitudinal angle and the first and second azimuthal angles, respectively.

5. The endoscopic imaging apparatus of claim 1 wherein the first altitudinal angle is about 38 degrees relative to horizontal.

6. The endoscopic imaging apparatus of claim 1 further comprising a viewing shield surrounding the perimeter of the reflection holographic optical element and extending generally toward a viewer.

7. The endoscopic viewing apparatus of claim 1 further comprising first and second front-surface mirrors associated with the first and second projectors, respectively, for redirecting light from the first and second projectors to the reflective displays such that central principal rays of the first and second images intersect at the reflective holographic optical element.

8. A method for creating a three-dimensional image of an object viewed through at least one endoscope, the method comprising:
   coaxially projecting first and second images from the at least one endoscope in opposite directions;
   redirecting rays of the first image from the at least one endoscope at a first azimuthal angle onto a reflective holographic element;
   redirecting rays of the second image from the at least one endoscope at a second azimuthal angle onto the reflective holographic element; and
   aligning the first and second images to co-illuminate the reflective holographic element such that principal rays from the first and second images substantially overlap, wherein the rays of the first image are reflected by the reflective holographic element to a first viewing zone and the rays of the second image are reflected to a second viewing zone by the reflective holographic element.

9. The method of claim 8 further comprising moving the reflective holographic element in response to movement of a viewer to maintain position of the first and second viewing zones relative to the viewer.

10. The method of claim 9 wherein moving the reflective holographic element comprises rotating the reflective holographic element.

11. A system for generating a three-dimensionally perceived image by at least one observer, the system comprising:
    a stereo endoscope having left and right cameras;
    a reflection holographic optical element; and
    a boom fixed relative to the reflection holographic optical element and extending over and away from the reflection holographic optical element;
    a left projector and a right projector secured to the boom and disposed with output lenses generally coaxially aligned in opposite directions and projecting corresponding left and right images received from the left and right cameras of the stereo endoscope toward corresponding left and right mirrors positioned to align principal rays from the left and right projectors on the reflection holographic element, the holographic optical element redirecting light from the left projector to a left eye-box and redirecting light from the right projector to a right eye-box for viewing by left and right eyes of an observer to create a three-dimensionally perceived image without glasses or optical headgear.

12. The system of claim 11, further comprising:
    an eye/head tracking system to move the boom and the reflection holographic optical element in response to observer movement such that the observer's eyes remain within corresponding left and right eye-boxes.

13. The system of claim 12 wherein the eye/head tracking system comprises an infrared camera element secured to the boom and in communication with a tracking computer that generates signals for a computer-controlled actuator that repositions the boom in response to observer movement.

14. The system of claim 13 wherein the computer-controlled actuator comprises a rotary stage.

15. The system of claim 11 wherein the first and second projectors are positioned such that associated central principal rays form an angle of about 38 degrees relative to horizontal.

16. The system of claim 11 further comprising a viewing shield extending around a perimeter of the reflection holographic element.

* * * * *

UNITED STATES PATENT AND TRADEMARK OFFICE
CERTIFICATE OF CORRECTION

PATENT NO.         : 8,284,234 B2
APPLICATION NO.    : 12/428118
DATED              : October 9, 2012
INVENTOR(S)        : Hans Ingmar Bjelkhagen Page 1 of 1

It is certified that error appears in the above-identified patent and that said Letters Patent is hereby corrected as shown below:

Column 11, Line 49, Claim 4:

After "second alignment"
Delete "minors" and insert -- mirrors --

Signed and Sealed this
Twenty-sixth Day of February, 2013

Teresa Stanek Rea
*Acting Director of the United States Patent and Trademark Office*